United States Patent [19]
Kotani

[11] Patent Number: 5,017,955
[45] Date of Patent: May 21, 1991

[54] AUTOFOCUS CAMERA WITH FLASH UNIT

[75] Inventor: Takaaki Kotani, Tokyo, Japan

[73] Assignee: Fuji Photo Film Co., Ltd., Kanagawa, Japan

[21] Appl. No.: 467,134

[22] Filed: Jan. 18, 1990

[30] Foreign Application Priority Data

Jan. 18, 1989 [JP] Japan .................................. 1-9193

[51] Int. Cl.⁵ .................... G03B 13/36; G03B 7/16; G03B 15/05
[52] U.S. Cl. .................... 354/400; 354/419; 354/421; 354/422
[58] Field of Search ............... 354/400, 402, 403, 413, 354/419, 420, 421, 422, 423, 137

[56] References Cited

U.S. PATENT DOCUMENTS

| Re. 29,599 | 3/1978 | Ogawa | 354/421 X |
| 4,317,624 | 3/1982 | Shenk | 354/421 X |
| 4,345,825 | 8/1982 | Matteson et al. | 354/421 |
| 4,362,372 | 12/1982 | Kiesel | 354/195 |
| 4,771,309 | 9/1988 | Ogihara et al. | 354/421 |
| 4,878,081 | 10/1989 | Kishida et al. | 354/137 X |
| 4,939,533 | 7/1990 | Okada et al. | 354/402 |

FOREIGN PATENT DOCUMENTS 59-144621 9/1984 Japan .

Primary Examiner—W. B. Perkey
Attorney, Agent, or Firm—Young & Thompson

[57] ABSTRACT

A camera is provided with a data table memory which stores control data for controlling not only the position of a taking lens but also the aperture size of a program shutter. The data also determines whether a flash unit is to be actuated depending on the subject distance as well as the subject brightness, so that the depth of field and hence the focusable range can be enlarged by stopping down the aperture and using a flash light. The data table memory further stores flash timing data for controlling the timing of flashing of the flash unit.

10 Claims, 10 Drawing Sheets

FIG. 9

| EV | 18 | 17 | 16 | 15 | 14 | 13~11 | 10~8 | 8~0 |
|---|---|---|---|---|---|---|---|---|
| F_NO | 28.5 | 19.2 | 14.5 | 12.5 | 9.5 | 6.2 | 5.6 | 2.8 |
| FLASH PULSE DATA | 64 | 68 | 72 | 76 | 104 | 144 | 152 | 272 |
| | 84 | 88 | 100 | 104 | 128 | 172 | 180 | 272 |
| S1 | 005 | 003 | 002 | 001 | 000 | 000 | 110 (108) | 110 (108) |
| S2 | 005 | 004 | 003 | 002 | 001 | 001 | 111 (108) | 111 (108) |
| S3 | 005 | 004 | 003 | 002 | 001 | 001 | 111 (108) | 111 (108) |
| S4 | 005 | 006 | 005 | 004 | 003 | 003 | 113 (128) | 113 (128) |
| S5 | 005 | 006 | 005 | 004 | 003 | 103 (128) | 113 (128) | 113 (128) |
| S6 | 005 | 006 | 006 | 006 | 005 | 005 | 115 (148) | 115 (148) |
| SHUTTER PULSE DATA S1 | 005 | 006 | 006 | 006 | 005 | 105 (148) | 115 (148) | 115 (148) |
| S2 | 005 | 006 | 007 | 007 | 007 | 006 | 116 (148) | 116 (180) |
| S3 | 005 | 006 | 007 | 007 | 007 | 107 | 117 (148) | 117 (180) |
| S4 | 005 | 006 | 007 | 007 | 008 | 008 | 018 (148) | 118 (180) |
| S5 | 005 | 006 | 007 | 007 | 008 | 009 | 019 (148) | 119 (180) |

Shutter/Flash pulse data (S1–S6) with ○/×/— indicators for each EV range.

AUTOFOCUS CAMERA WITH FLASH UNIT

FIELD OF THE INVENTION

The present invention relates to an autofocus camera having a flash unit, especially to an autofocus camera in which the flash unit is automatically actuated to flash depending on not only subject brightness but also subject distance as detected by the autofocus system.

BACKGROUND OF THE INVENTION

In current compact cameras, the position of the taking lens is automatically adjusted according to the subject distance as detected by a distance measuring device, and the exposure is automatically controlled according to the subject brightness as detected by a light measuring device, in order to obtain a good quality picture with a minimum of manual operation. The autofocus and automatic exposure control functions are performed using a microcomputer incorporated in the camera. In addition, a flash unit is known in the art which is automatically actuated to flash when the detected subject brightness is below a predetermined level.

In flash photography in which a flash unit is used as supplementary light for exposure, the diameter of the aperture, for example the diameter of the aperture at the moment when the flash unit flashes in case of a camera having a program shutter, which controls aperture selection as well as shutter speed, is ordinarily smaller than that in cameras without a flash unit under the same conditions. It is known in the art that the depth of field becomes greater when stopping down the aperture; however, the decision as to whether flash light is to be projected or not is conventionally dependent on the subject brightness alone, and does not take advantage of the above-mentioned desirable characteristic of flash photography that the depth of field is enlarged by stopping down the aperture. That is, a greater depth of field makes the focusing function not so strictly dependent on the precision of the autofocus system.

OBJECTS OF THE INVENTION

An object of the invention is therefore to provide an autofocus camera with a flash unit in which flash light is automatically projected onto the subject as supplementary light even when the subject brightness is at such a level as would not conventionally require supplementary light, so as to stop down the aperture and hence enlarge the depth of field, and in which the position of the taking lens is adjusted based on the enlarged depth of field so as to sharpen the photographic images.

SUMMARY OF THE INVENTION

The above and other objects and advantages of the present invention can be achieved by providing an autofocus flash-type camera having a data table memory which stores lens position data for positioning a taking lens and flash flag data for indicating whether flash photography is to be executed, and a control means for controlling the position of the taking lens and the flashing of a flash unit according to data which are read out from the data table memory depending on the subject brightness and the subject distance.

According to a preferred embodiment of the present invention, the camera is provided with a program shutter. In this embodiment, in order to cause the flash unit to flash at a proper timing with respect to the aperture diameter of the program shutter, the data table memory also stores flash timing data and aperture data according to which the control means controls the timing of the flash unit and the aperture of the program shutter.

Thanks to the above construction, it is possible to project the flash light onto the subject even when the subject brightness is at such a level as would not conventionally require supplementary light, so that the aperture can be stopped down and hence the depth of field can be enlarged. The taking lens is therefore adjusted under the enlarged depth of field, thereby sharpening the obtained photographic image.

BRIEF DESCRIPTION OF THE DRAWINGS

Other objects and advantages of the present invention will become apparent from the following detailed description when read in conjunction with the accompanying drawings, wherein:

FIG. 9 is a data table for determining the taking lens position and the flash timing;

DETAILED DESCRIPTION OF THE PREFERRED EMBODIMENTS

Figure 1:
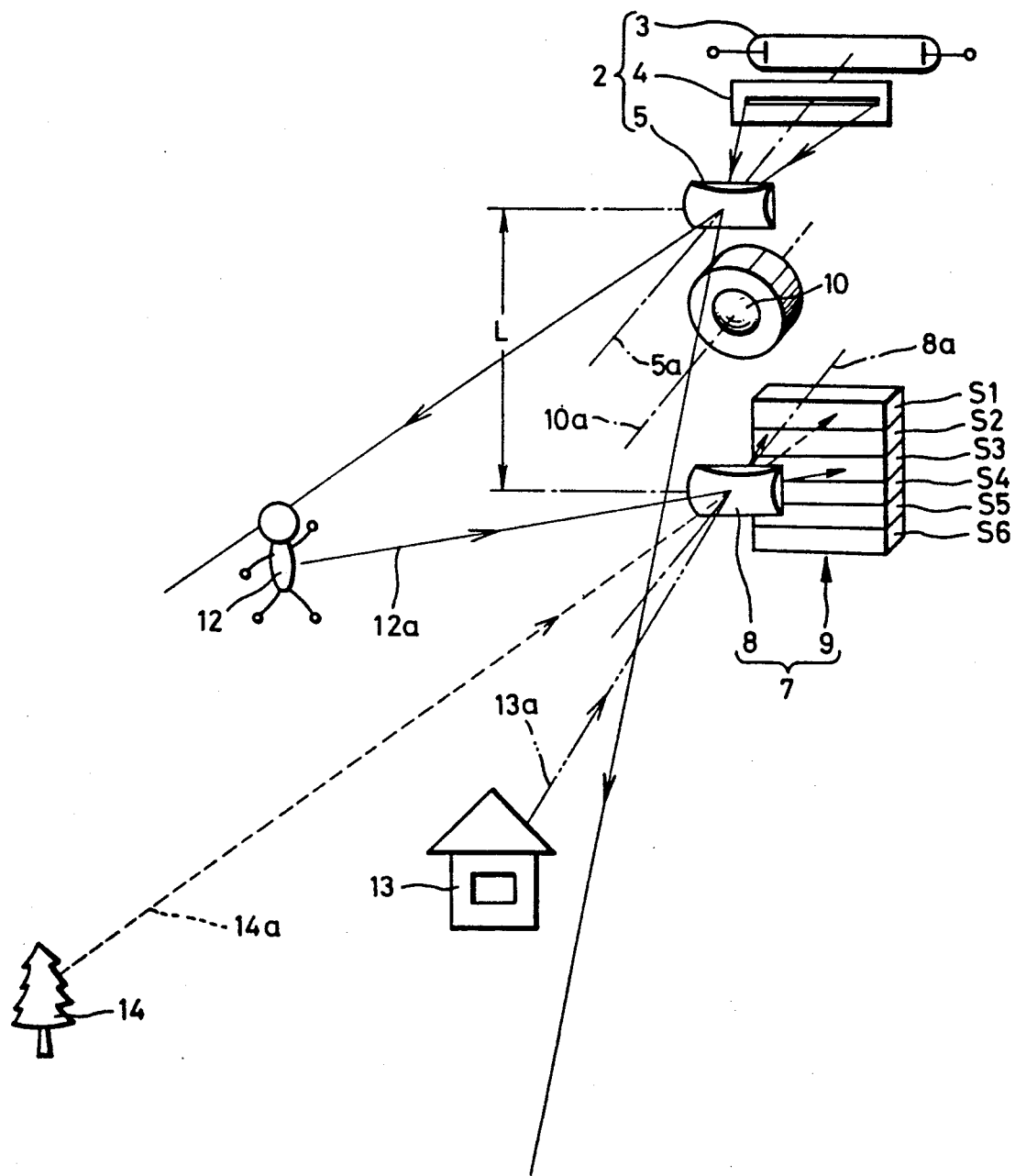
FIG. 1 shows an example of the optical system of a distance measuring device used in a camera according to the invention.

FIG. 1 shows diagrammatically an embodiment of the optical system of the distance measuring device according to the invention. The light projecting unit 2 comprises a discharge tube 3 for emitting near-infrared light, a slit plate 4 for shaping the light from the discharge tube 3 in the form of a slit, and a light projecting lens 5. The light receiving unit 7 comprises a light receiving lens 8 and a photosensor 9. The respective optical axes 5a and 8a of the light projecting lens 5 and light receiving lens 8 are parallel to the optical axis 10a of a taking lens 10, and are spaced apart from each other by a base line length L. As will be described in more detail below, the photosensor 9 is composed of small light receiving elements S1 to S6 of laterally elongated shape which are arranged in the direction of the base line L of the camera.

The light projecting unit 2 projects a slit of light toward a principal subject. If a fraction of the light projected from the projecting unit 2 is reflected from a subject 12 within the near distance range, the reflected light 12a is received by the light receiving element S3. If a fraction of the light is reflected from a subject 13 within the middle distance range or a subject 14 within the far distance range, the reflected light 13a or 14a is received by the light receiving element S2 or S1, respectively. Thus, by identifying the light receiving element of the photosensor 9 on which the light reflected from the subject falls, it is possible to detect the subject distance.

By using such a slit of light as the light beam for distance measurement, even when the principal subject is not in the center of a photographing frame, the light reaches the subject, so that it becomes unnecessary to aim at the principal subject during distance measurement and then re-frame the scene to be photographed. However, it is also possible to use a spot light for distance measurement instead of a slit light.

Figure 3:
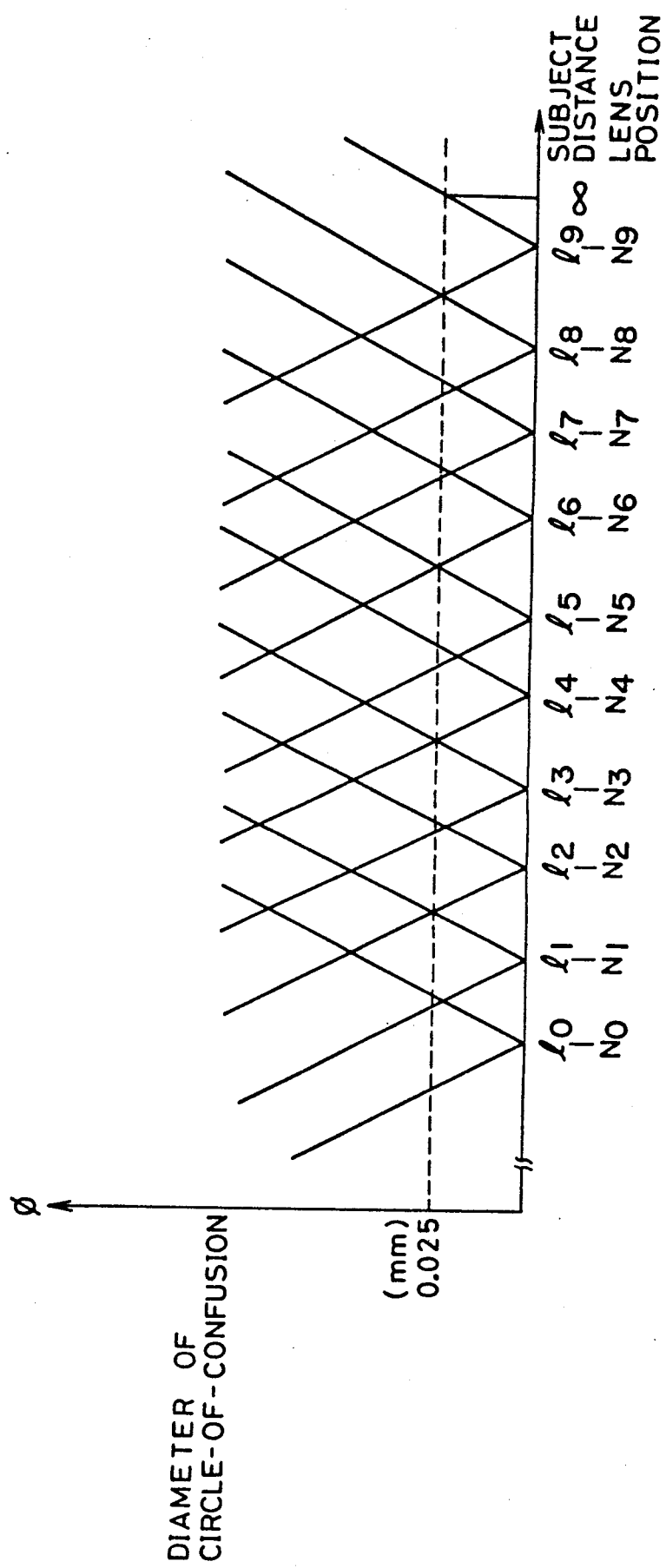
FIG. 3 illustrates a relationship between the subject distance and the taking lens position.

FIG. 3 shows the position of taking lens 10 relative to the subject distance. The taking lens 10 positioned in lens positions $N_0$ to $N_9$ focuses most exactly on a subject at distance $l_0$ to $l_9$, respectively. But the taking lens 10 can be continuously brought into focus on any subject within a range from a distance of about $D_0$ to infinity thanks to the depth of fields of the taking lens 10, assuming that the diameter of the permissible circle of confusion is 0.025 mm.

Figure 4:
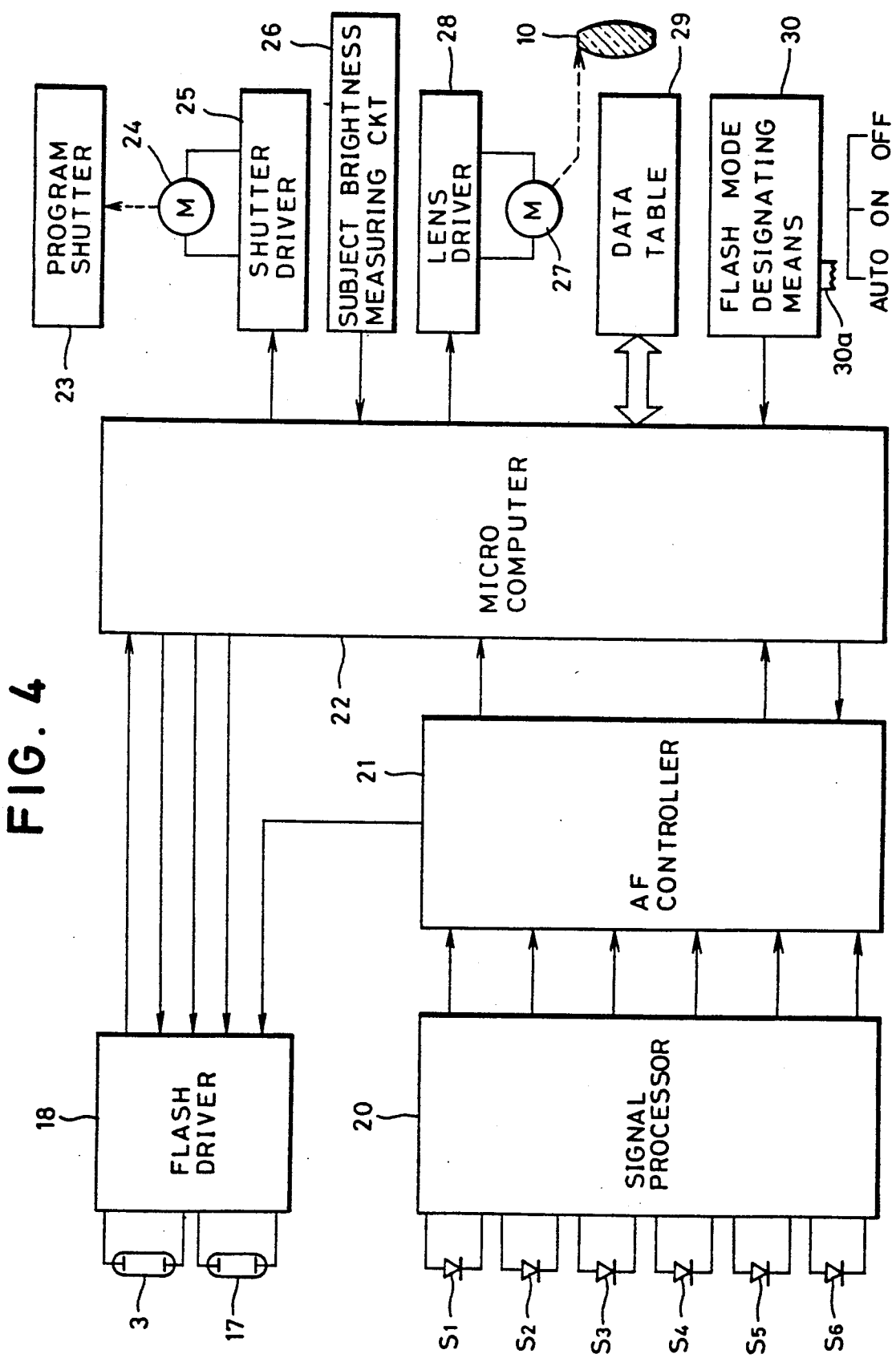
FIG. 4 is a block diagram showing the arrangement of the electric circuits of the distance measuring device shown in FIG. 1.

The discharge tube 3 and the photosensor 9 are used in connection with the circuit shown in FIG. 4. Actuation of the discharge tube 3 for distance measurement is controlled by a flash driver 18 which also controls the actuation of a flash unit comprising a discharge tube 17 for illuminating subjects during photographing. The light receiving elements S1 to S6 of the photosensor 9 are connected to a signal processor 20 which processes photo-electrical output signals from these light receiving elements. The signal processor 20 is connected to an AF (autofocus) controller 21 which converts the outputs of the signal processor 20 into a distance measurement signal and transmits it to a microcomputer 22. The AF controller 21 also outputs a trigger signal to the discharge tube 3 at proper timings, which will be described in more detail below.

Connected to the microcomputer 22 are the flash driver 18, the AF controller 21 and other circuits including a shutter driver 25 for controlling a stepping motor 24 for opening and closing of a program controlled shutter 23, a subject brightness measuring circuit 26, a lens driver 28 for driving a stepping motor 27 to move the taking lens 10 for focusing, and a data table memory 29. The data table memory 29 stores data of the focusing position of the taking lens 10 which is read out based on distance measurement data and subject brightness data detected by the subject brightness measuring circuit 26. The data table memory 29 will be described in more detail below.

The microcomputer 22 is also supplied with a mode signal by a flash mode designating means 30 according to the position of a manually operated knob 30a. When the knob 30a is set at the "OFF" position, the discharge tube 17 is prevented from flashing, whereas the discharge tube 17 is caused to flash any time the knob 30a is at the "ON" position. By setting the knob 30a at the "AUTO" position, the microcomputer 27 determines whether flash photograph is to be effected considering the distance measurement data as well as the subject brightness data.

Figure 5:
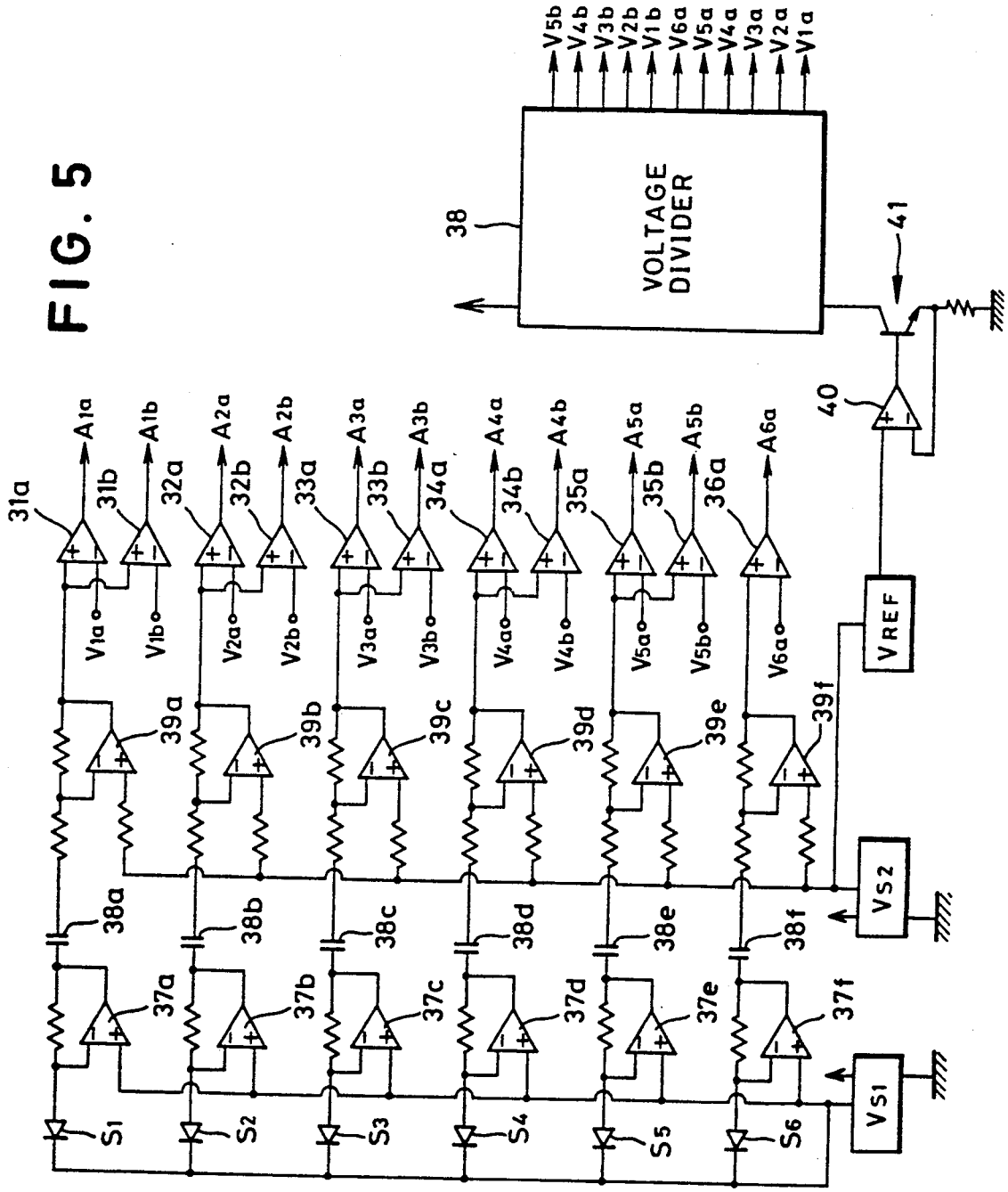
FIG. 5 shows an example of a signal processor used in the distance measuring device shown in FIG. 4.

FIG. 5 is a circuit diagram of the signal processor 20. Photo-electric current from the light receiving elements S1 to S6 is transformed into voltage signals by first stage operational amplifiers 37a to 37f to which a reference voltage Vs1 is applied. Since the obtained voltage signals have DC components, for example, arising from external light or sunlight and the like, a capacitor 38a to 38f is connected to the output of each first stage operational amplifier so as to eliminate the low frequency component. Voltage signals free of DC components are thus supplied to second stage operational amplifiers 39a to 39f to which another reference voltage Vs2 is applied. The signals amplified by a certain amplification factor by the second stage operational amplifiers 39a to 39e are supplied to comparators 31a, 31b, 32a, 32b, . . . , 35a, 35b, two for each light receiving element S1 to S6. Only a single comparator 36a receives the signal from the light receiving element S6.

The comparators 31a, 31b, 32a, 32b, . . . 35a, 35b are supplied with individual reference voltages Vna, Vnb (n=1, 2, 3, . . .), from a voltage divider 42, respectively, wherein Vna<Vnb. Accordingly, the photo-electric output of each light receiving element is, after being amplified by a predetermined factor by the first and second operational amplifiers, compared with two different reference voltages Vna and Vnb. When the photo-electric output of a light receiving element is determined to be above the first reference voltage Vna or the second reference voltage Vnb, the corresponding comparator outputs a high level (H) signal, whereas it outputs a low level (L) signal when the photoelectrical output is below its reference voltage. In this way, the output of each light receiving element S1 to S6 is amplified and compared with high and low reference voltages Vna and Vnb by two respective comparators, resulting in two series of binary signals Ana and Anb (n=1, 2, 3, . . .) which become H level when the output of the light receiving element is above the respective reference voltage. These signals Ana and Anb are the output signals of the signal processor 20, which are transformed into first and second distance measurement signals and processed as distance measurement data in the microcomputer 22. The microcomputer 22 selects either one of each pair of these distance measurement data as suitable for focusing depending on the intensity of the reflected light.

Using the low reference voltages, it is possible to detect light of a relatively low brightness level and therefore to detect subjects which are relatively low in brightness or in far distant range. For this reason, standard distance measurement is effected based on these low reference voltages. If, on the other hand, the light receiving element receives high intensity light reflected from a subject, then not only will the element in question generate a false signal but also the neighboring elements will generate false signals due to cross-talk, with the result being an erroneous distance measurement. Such high intensity light can be reflected particularly from a subject within the near range.

The above problems can be solved by using the high reference voltages, but it is sometimes impossible in this case to detect a subject in far distant range because the light reflected therefrom often has a low intensity level.

Accordingly, it is desirable to generate the first and second distance measurement data based on low and high reference values, respectively, and to select suitable ones of these data in accordance with predetermined conditions.

In the present embodiment, the reference voltages Vna, Vnb are set lower for a light receiving element nearer to the light receiving element S1 which receives light reflected from a subject at a greater distance, and are set higher for a light receiving element nearer to the light receiving element S6 which receives light reflected from a less distant subject. Namely, the reference voltages Vna and Vnb are set as follows: V6a>V5a>V4a>...>V1a, and V5b>V4b>...>V1b. Such an arrangement is employed in recognition of the fact that the intensity of light reflected from a subject in far distant range is generally low as compared with that from a subject in near range. According to this arrangement, light reflected from a subject such as human skin having standard reflectance (luminance factor) can be detected fairly well even with fixed amplification factors of the first and second stage operational amplifiers.

Figure 6:
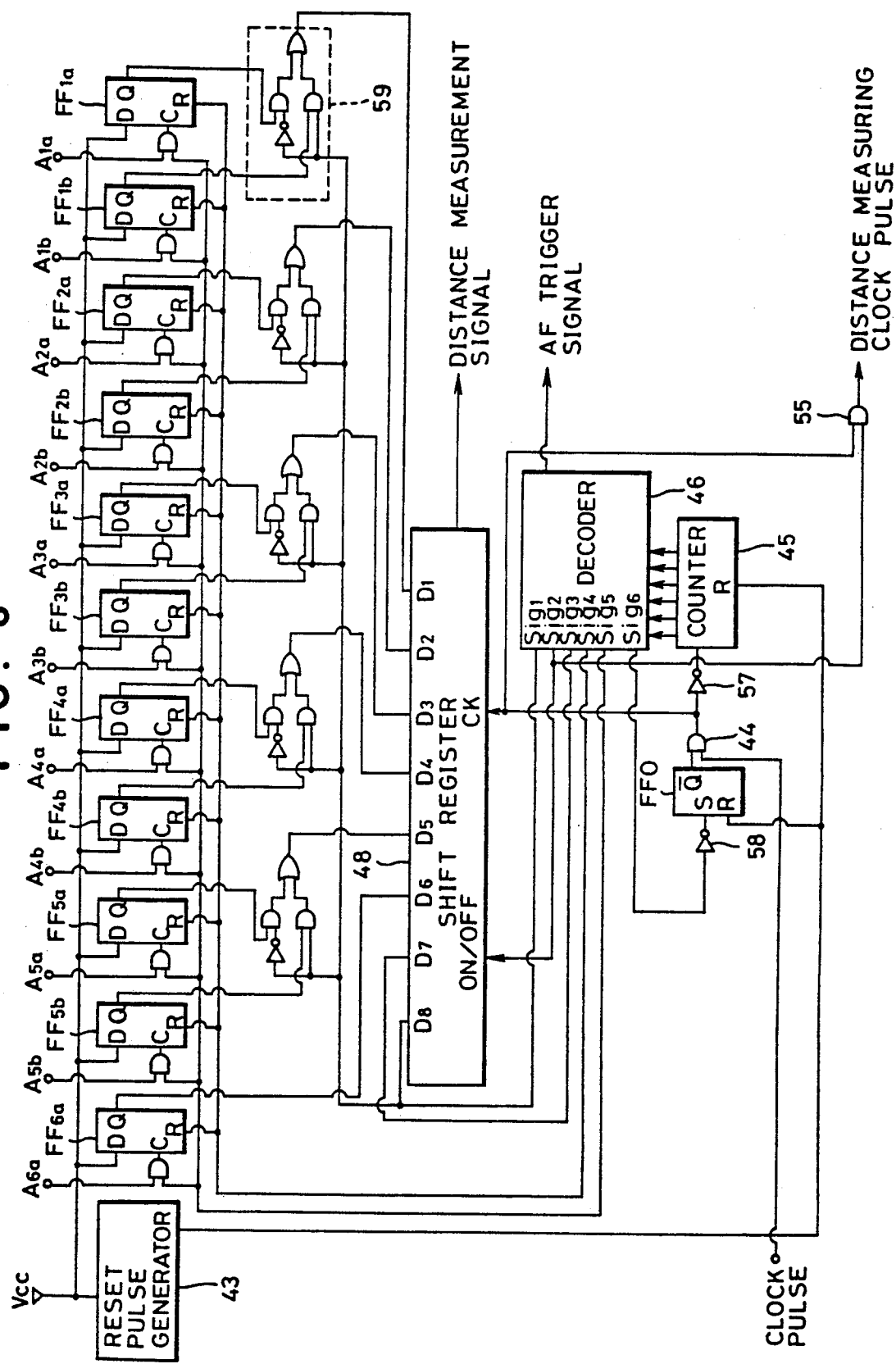
FIG. 6 is a circuit diagram showing an example of an AF controller.

FIG. 6 is a circuit diagram showing an example of the AF controller. H or L signals A1a, A1b, A2a, A2b..., A6a at the outputs of the comparators 31a, 31b, 32a, 32b... 36a are supplied to the clock (CL) input terminals of D flip-flops FFna, FFnb (n=1, 2, 3, ...) each of which is connected to its respective comparator through an AND gate Gna or Gnb.

Besides the above D flip-flops FFna and FFnb, the AF controller 21 comprises a reset pulse generator 43 for outputting a reset pulse a predetermined time lapse after a power source Vcc is turned on, a counter 45 for counting clock pulses supplied from the microcomputer 22, a decoder 46 for outputting control signals Sig1 to Sig6 for executing the distance measurement sequence in response to a count value of the counter 45, and a shift register 48 for receiving the output signals of the D flip-flops FFna and FFnb and outputting the distance measurement signal which is processed by the microcomputer 22 as the distance measurement data.

Figure 7:
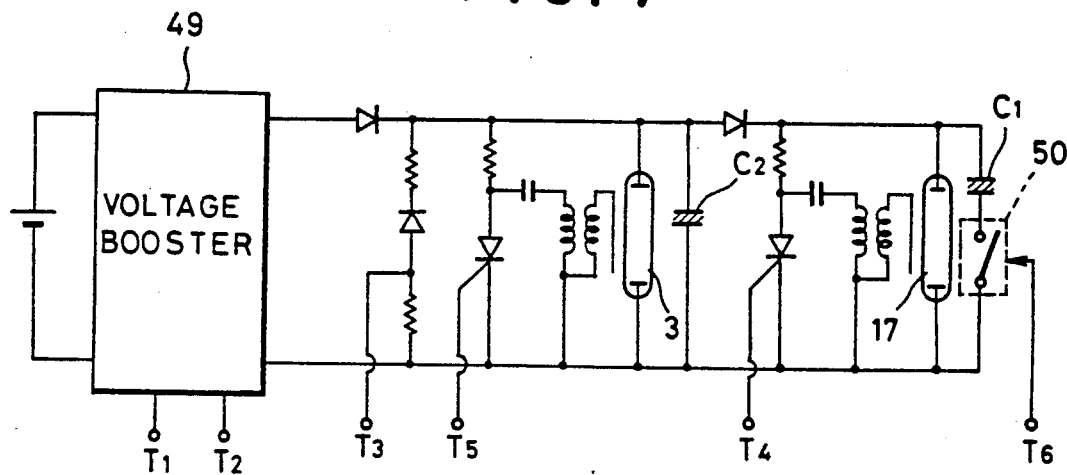
FIG. 7 is a circuit diagram showing an example of a flash driver.
Figure 8:
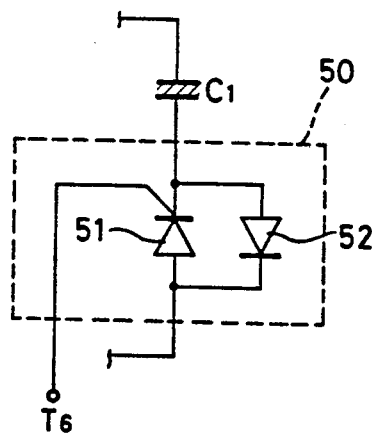
FIG. 8 is a circuit diagram showing an example of a switch used in the flash driver.

FIG. 7 is a circuit diagram of the flash driver 18 which controls the operation of the discharge tubes 3 and 17. Capacitors C1 and C2 are used to supply light emission energies to the discharge tubes 3 and 17, and are charged through a voltage booster 49. The capacitor C1 is connected in series with a switch 50 which turns on when the microcomputer 22 applies an H signal to a terminal T6 of the flash driver 18, and turns off upon receipt of an L signal. If the switch 50 is a semiconductor switch comprising a thyristor 51 and a diode 52 as shown in FIG. 8, it is unnecessary to apply an H signal continuously to the terminal T6 while charging the capacitor C1. The other terminals T1, T2, T3, T4 and T5 of the flash driver 18 are used as an input for an oscillation start signal of the voltage booster 49, an input for an oscillation inhibit signal, an output for a charge completion signal of the capacitor C2, an input for a flash trigger signal for the discharge tube 17 for illuminating the subject, and an input for a flash trigger signal for the discharge tube 3 for distance measurement, respectively.

Referring to FIG. 9, the operation of an embodiment of the present invention will now be described.

FIG. 9 shows conceptually an example of the data table memory 29 of FIG. 4, in which EV indicates the subject brightness data, and $F_{N0}$ is the f-number corresponding to the maximum aperture which is predetermined according to the subject brightness. The data table memory 29 also stores shutter pulse data which indicates the number of clock pulses required for opening the program shutter to the maximum aperture corresponding to the f-number indicated above it in the table.

For example when EV=16, the microcomputer 22 reads out a shutter pulse data "72" from the data table memory 29 and counts the cock pulses up to 72, meanwhile the stepping motor 24 being driven to open up the program shutter 23 to an aperture diameter corresponding to the f-number $F_{N0}$ = 14.5. Thereafter the program shutter 23 is closed during counting of the next 72 clock pulses. Flash pulse data is used to determine the timing of flashing of the discharge tube 17 according to the subject brightness data when the flash mode designating means 30 is set in the "ON" mode. The flash pulse data is also stored in the form of the number of clock pulses to be counted from the beginning of shutter opening.

The data table memory 29 also includes data areas whose addresses are designated by the subject brightness data EV and the distance measurement data. As described above, the distance measurement data is a bit pattern of 6-bits which substantially corresponds to the light receiving pattern of the light receiving elements S1 to S6 as shown in the lower left columns of the data table of FIG. 9, wherein "o" indicates that the corresponding light receiving element receives light of an intensity above a predetermined level, "x" indicates that the corresponding light receiving element does not receive light above the predetermined level, and "-" indicates that light received in the corresponding light receiving element is independent of distance measurement. For example, when the light receiving element S5 is "o" and the light receiving element S4 is "x", then the distance measurement data obtained therefrom is always processed as "010000" even if any of the other light receiving elements S6, S3, S2 or S1 outputs a signal indicating the reception of light above the predetermined level, since such signal can be disregarded as representing light reflected from other than the principal subject.

Each data area stores control data including "flash flag", "aperture-priority flag", and "lens position data". In FIG. 9, the left bit indicates the flash flag bit which is used to determine whether the flash unit is to be actuated when the flash mode designating means 20 is set in the "AUTO" mode. The flash flag "1" instructs effecting automatic flash photography. The middle bit is the aperture-priority flag bit which is used to determine whether the shutter is to be controlled in aperture-priority mode when the flash mode designating means 30 is set in the "OFF" mode. Of these data areas, the data areas having a flash flag "1" store flash timing data in the form of the number of clock pulses shown in parentheses which also indicates aperture data for automatic flash photography. That is, if the flash mode designating means 30 is set in the "AUTO" mode, and the selected data area has a flash flag "1", the program shutter 23 is controlled to open during counting of the clock pulses up to a number as indicated in parentheses, e.g. 128 clock pulses, and the flash unit is actuated to flash at the moment when the 128th clock pulse is counted, and immediately thereafter the program shutter 23 beings to close.

If the flash mode designating means 30 is set in the "OFF" mode, it is determined whether the selected data area has an aperture-priority flag of "1" or "0". In case the aperture-priority flag is "1", the program shutter 23 is controlled according to a program for aperture-priority photography. In aperture-priority photography, the number shown in parentheses of each data area having aperture-priority flag "1" is used as the aperture data for aperture-priority photography, namely the number of clock pulses for controlling the program shutter 23 in the same manner as the above-described shutter pulse data.

The lens position data are shown as decimal numbers in the table of FIG. 9 which correspond to the respective lens positions $N_0$ to $N_9$ of FIG. 3. When the lens position data is "3", the lens position $N_3$ is selected as a focusing position, and when the lens position data is "5", the lens position $N_5$ is selected.

Figure 2:
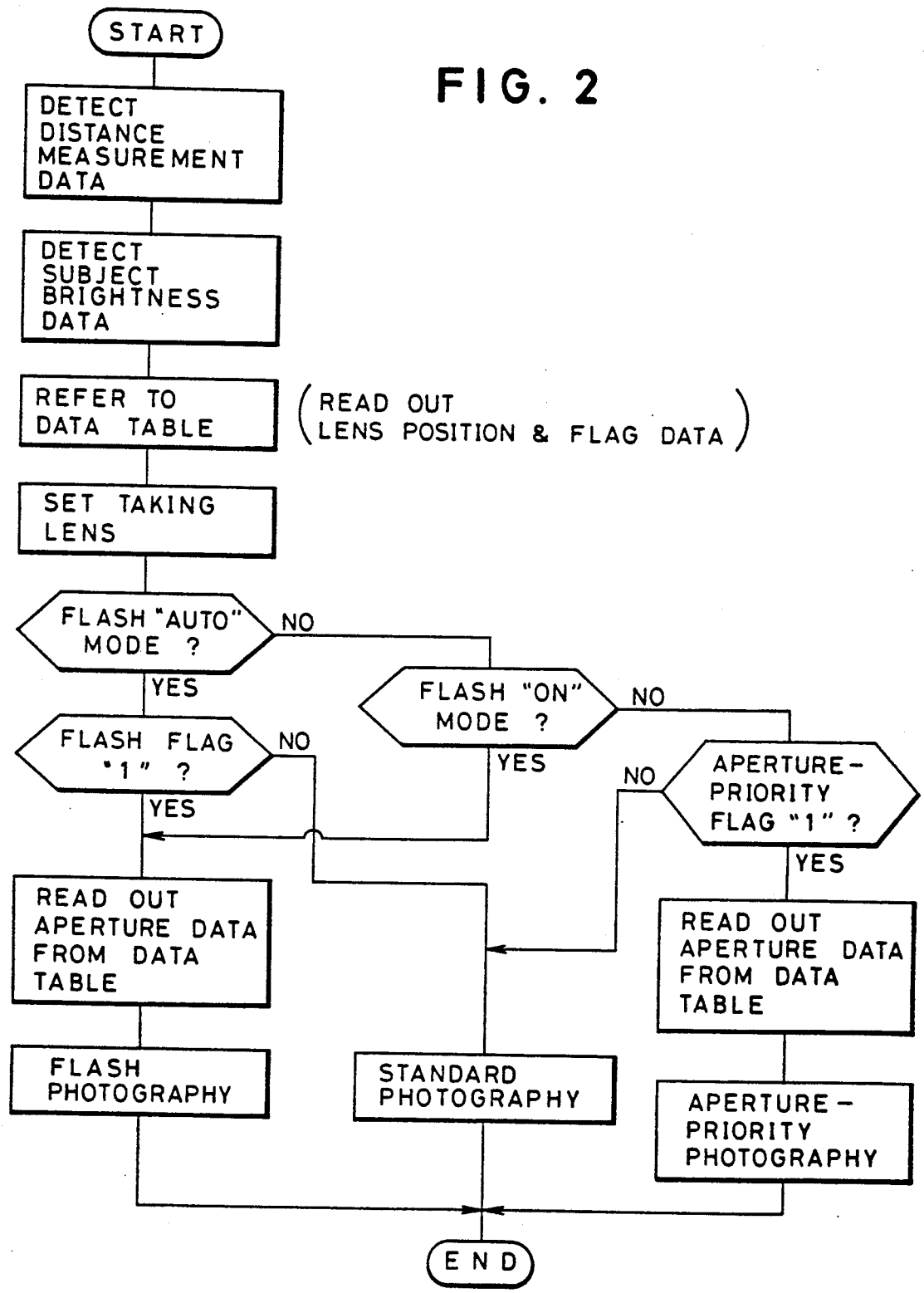
FIG. 2 is a flow chart showing the sequence of automatic control in one embodiment of the invention.

The flow chart of FIG. 2 shows the operation of the camera according to the above embodiment. At first, upon turning on a power switch, the voltage booster 49 as shown in FIG. 7 starts charging the capacitors C1 and C2. A charge completion signal supplied from the capacitor C2 to the microcomputer 22 enables the camera to take pictures.

Figure 10:
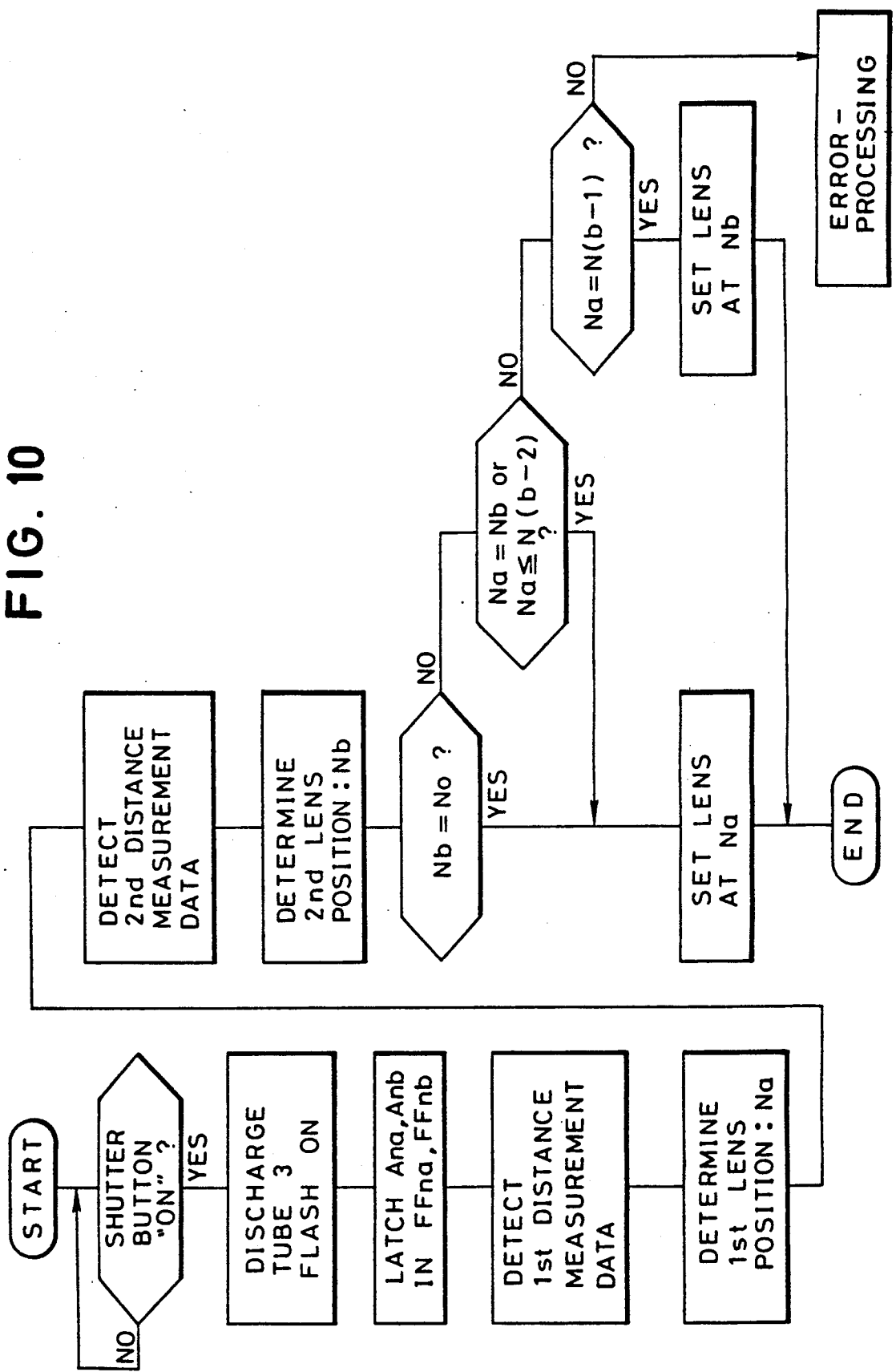
FIG. 10 is a flow chart showing the sequence of automatic focusing.

Upon depressing a shutter button (not shown), the AF control circuit 21 is supplied with voltage from the power source Vcc so that the distance measuring device is actuated to execute the distance measurement sequence according to the flow chart of FIG. 10. After an appropriate time necessary for stabilization of the power source Vcc has elapsed, the reset pulse generator 43 outputs a reset pulse which resets the flip-flop FFO. The flip-flop FFO then outputs at its $\overline{Q}$ terminal an H signal for opening an AND gate 44 which is connected to the counter 45 through an inverter 57. Simultaneously with this, the reset pulse from the reset pulse generator 43 also resets the counter 45.

The microcomputer 22 begins to supply clock pulses to the AF control circuit 21 after a predetermined time delay from the time the distance measuring device is actuated. During this time delay, the reference voltages Vna and Vnb of the comparators 31a, 31b, 32a, 32b, . . ., 35a, 35b, 36a of the signal processor 20 are stabilized, and other necessary operations are performed. The clock pulses from the microcomputer 22 are supplied to the counter 45 through the AND gate 44 and inverter 57. The decoder 46 connected to the counter 45 controls the distance measurement sequence in accordance with the clock count value of the counter 45.

The decoder 46 supplies reset pulses Sig3 and Sig4 to the flip-flop FFna and FFnb, respectively. Thereafter, the decoder 46 supplies an AF trigger signal to the flash driver 18 at its terminal T5, causing the discharge tube 3 to flash light. Immediately after outputting the AF trigger signal, the decoder 46 outputs a read pulse Sig5 having a predetermined pulse width which is supplied to one of the terminals of AND gates Gna and Gnb which are connected to the clock (C) terminals of the flip-flops FFna and FFnb.

The other terminals of the AND gates Gna and Gnb are connected to the output terminals of the comparators 31a, 31b, 32a, 32b, . . . 35a, 35b, 36a of the signal processor 18, respectively. The binary output signals Ana and Anb are supplied to the D flip-flops FFna and FFnb, respectively, so long as the read pulse Sig5 maintains H level. If the output signal Ana or Anb is H level, the corresponding D flip-flop FFna or FFnb is set to output at its Q-terminal a binary signal "1", and if the output signal Ana or Anb is L level, the corresponding D flip-flop FFna or FFnb outputs at its Q-terminal a binary signal "0".

After a predetermined time elapses from output of the read pulse, the decoder 46 outputs an H signal at its terminal Sig2 which is supplied to an "ON/OFF" terminal of the shift register 48. When the signal Sig2 is H level, an AND gate 55 is opened. Then, the clock pulses which are supplied to a clock (CK) terminal of the shift register 48 through the AND gate 44, are also supplied to the microcomputer 22 through the AND gate 55, and processed as distance measuring clock pulses.

As long as the "ON/OFF" terminal continues to receive the H signal Sig2, each time a clock pulse is applied to the CK terminal of the shift register 48, the bit data held in the shift register 48 is shifted one bit after another. A signal Sig1 of the decoder 46 is L level at the beginning of the distance measurement sequence, so that five selectors 59 initially transmit the output signals from the Q-terminal of the D flip-flops FFna to the shift register 48, which correspond to the output signals Ana of the comparators 31a, 32a, 36a having the lower reference voltage Vna. The shift register 48 then sends the first distance measurement signal to the microcomputer 22. For example, if the output signals A3a and A4a are H level while A1a, A2a, A5a and A6a are L level, the D flip-flops FF3a and FF4a output a "1" signal, and the first distance measurement signal is "001100". As described above, so long as the output signal A5a is L level while the A3a and A4a are H level, the resulting distance measurement signal is always processed as a distance measurement data "001100" in the microcomputer 22 even if any of the other output signals A1a, A2a or A6a happen to be H level.

The microcomputer 22 thus reads out a first lens position from the data table memory 29 based on the first distance measurement data "001100" and a subject brightness data E detected by the subject brightness measuring circuit 26. For example, taking the subject brightness data to be EV=12, that data area which stores control data "103" is addressed in the data table memory 29 so that the lens position $N_3$ is selected as the first lens position.

After the first distance measurement signal is sent to the microcomputer 22, the signal Sig1 of the decoder 46 becomes H level, so that the five selectors 59 transmit the output signals from the Q-terminal of the D flip-flops FFnb to the shift register 48 which correspond to the output signals Anb of the comparators 31b, 32b, 35b whose reference voltages Vnb are higher than Vna. In the same manner as with the first distance measurement data, a second distance measurement data is detected. If the second distance measurement data is "000100" while the subject brightness data EV=12, then the microcomputer 22 selects data "005" with reference to the data table memory 29 and determines the lens position $N_5$ as the second lens position.

After the first and second distance measurement signals have been sent to the microcomputer 22, a signal Sig6 of the decoder 46 changes over from H to L level, setting the flip-flop FFO through the inverter 58. The AND gate 44 then closes, and the counter 45 stops counting, thus completing the distance measurement.

The microcomputer 22 then determines in accordance with the flow chart of FIG. 10 whether it is proper to focus at the first or the second lens position $N_3$ or $N_5$. Namely, assuming that the first and the second lens position are Na and Nb, respectively, the final lens position is selected according to the following criteria:

$Nb = N_0$ (see FIG. 3) $\rightarrow$ Na  (i)

$Nb = Na$ or $Na < N(b-2) \rightarrow Na$  (ii)

$Na = N(b-1) \rightarrow Nb$  (iii)

In further detail, the microcomputer 22 fundamentally selects the first lens position Na detected based on the lower reference voltage. In criterion (i), the first lens position Na is proper because Na must also be $N_0$ if the second lens position Nb is truly $N_0$. Even if Na is not $N_0$, this means that Nb is based on insufficient distance measurement data, and therefore Na is proper. In criterion (ii), it is no problem to select Na when Na=Nb. When Na is on the nearer side by two or more steps than Nb, the second distance measurement data can be judged as false data affected by the background light, and hence Na should be selected. In criterion (iii), Na can be judged as being detected by an erroneous distance measurement due to cross-talk, so that Nb is selected as proper.

In other cases than the above three cases, namely when Na>Nb, it is possible to execute an error-processing indicative of trouble in distance measurement or directing a repetition of distance measurement.

Because the present embodiment responds to criterion (ii), the first lens position $N_3$ is selected as the final lens position. Then, the flash flag and the aperture-priority flag as well as the aperture data stored in the same data area as the selected lens position data are read out by the microcomputer 22 which supplies drive pulses of a number corresponding to the lens position $N_3$ to the lens driver 28. The lens driver 28 drives the stepping motor 27 to move the taking lens 10 into the lens position $N_3$.

During this distance measurement sequence, the shutter button is locked. When the taking lens 10 has been brought into the selected lens position, the lock of the shutter button is automatically released, enabling exposure operation.

Figure 11:
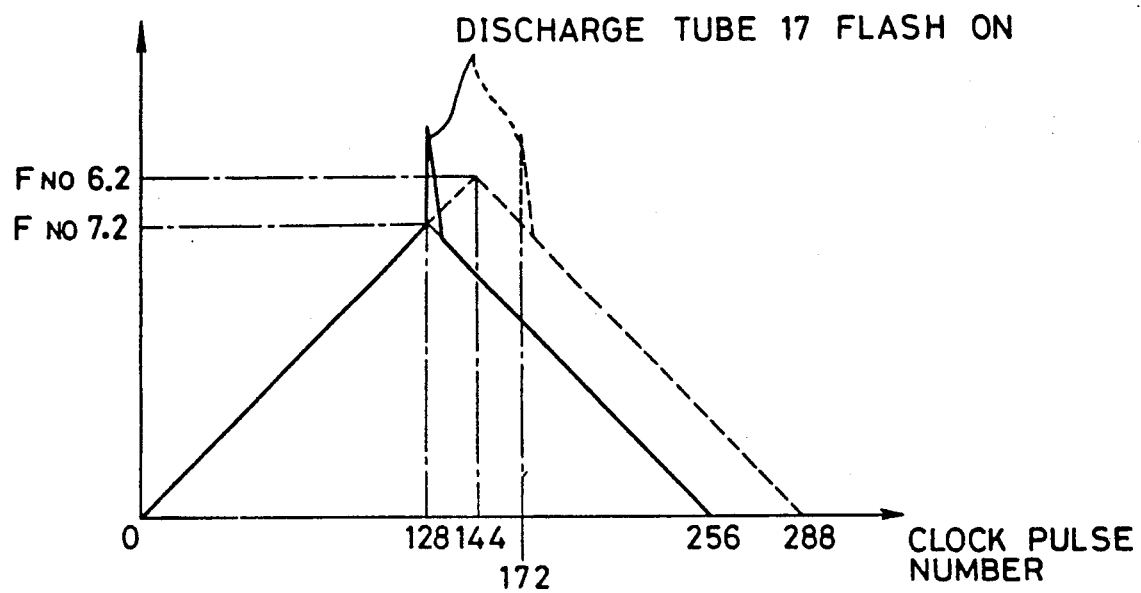
FIG. 11 is a diagram showing the operation of a program shutter in a flash photography operation.

Upon further depressing the shutter button, the selected mode of the flash mode designating means 30 is checked. If it is the "AUTO" mode, it is determined whether the flash flag within the control data is "1" or "0". Because the flash flag is "1" in the above example, flash photography is automatically effected. In this flash photography, the program shutter 23 is controlled to open and close depending on the above aperture data. Because the aperture data is "128" in this case, the microcomputer 22 supplies 128 clock pulses to the lens driver 25 so as to open the program shutter 23 up to the maximum aperture corresponding to $F_{N0}=7.2$, and then the program shutter 23 is closed during the next 128 clock pulses, as is shown by solid lines in FIG. 11.

At the time when the 128th clock pulse has been supplied to the shutter driver 25, the microcomputer 22 applies a trigger signal to the terminal T4 of the flash driver 18, causing the discharge tube 17 to flash and illuminate the subject.

Even when the subject brightness data is EV=12, if the distance measurement data is "001000", though the lens position is also set at $N_3$, a standard exposure control program is executed because the control data "003" is selected, and hence the flash flag is "0". At that time, the program shutter 23 is opened up to the maximum aperture corresponding to $F_{N0}=6.2$, while the shutter driver 25 is supplied with 144 clock pulses. During the next 144 clock pulses, the program shutter 23 is closed. If, at that time, the flash mode designating means 30 is set in the "ON" mode, the discharge tube 17 is controlled to flash when the 172nd clock pulse is counted. This case is shown by dashed line in FIG. 11.

As described above, according to the present invention, the determination as to whether the flash unit is to be actuated is dependent on not only the subject brightness data but also the distance measurement data and the selected lens position. Therefore, by using flash light for a scene having a relatively high brightness level, for example EV=12 at which supplementary light is usually regarded as unnecessary, it becomes possible to enlarge the focusable range due to enlarged depth of field because the aperture becomes smaller than in photography without supplementary light under the same conditions.

When the flash mode designating means 30 is set in the "OFF" mode, it is determined whether or not the exposure control is executed according to the aperture-priority photography program. For example when the distance measurement data is "011000" and the subject brightness data is EV=12, the data area containing the control data "001" is selected so that the program shutter 23 is controlled to open up to the maximum aperture corresponding to $F_{N0}=6.2$ while counting 144 clock pulses, and then to close during the next 144 clock pulses, as is shown by dashed line in FIG. 12. This is because the aperture-priority flag is "0". On the other hand, if the aperture-priority flag is "1", for example when the subject brightness data is EV=10 while the distance measurement data is also "011000", the data area containing the aperture data "108" as well as the control data "111" is selected so that the microcomputer 22 executes the aperture-priority exposure according to the aperture data "108" as is shown by solid line in FIG. 12.

Figure 12:
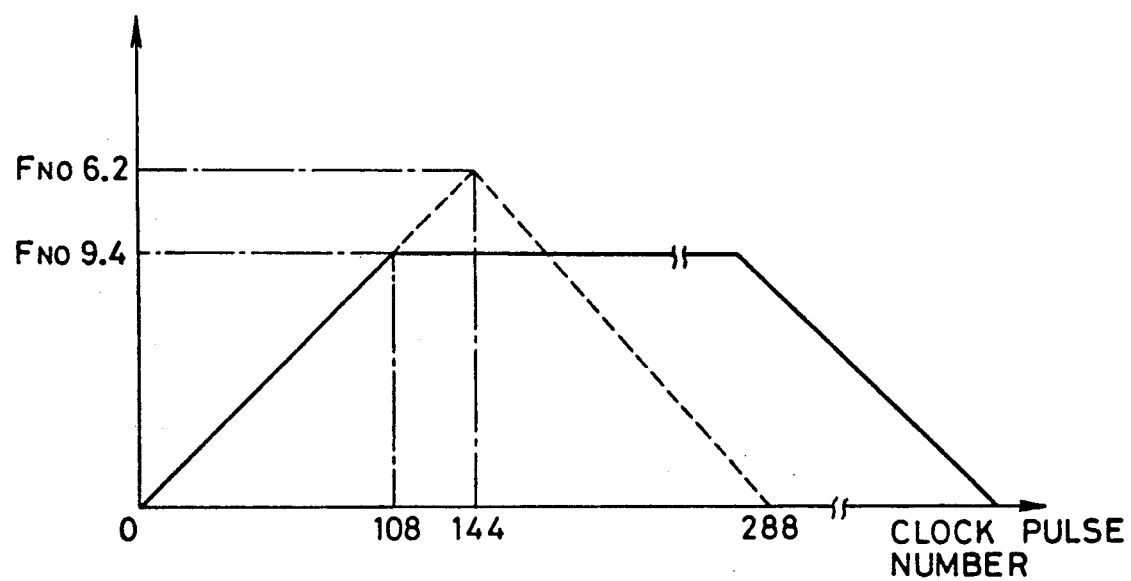
FIG. 12 is a diagram showing the operation of a program shutter in an aperture-priority photography operation.

As shown in FIG. 12, the program shutter is opened up during the counting of 108 clock pulses, and then kept at the latest opened position for a predetermined time duration, and thereafter begins to close. Because the program shutter 23 is not opened up to the maximum aperture corresponding to $F_{N0}=5.6$ for EV=10, but stopped down to $F_{N0}=9.4$ during exposure, the depth of field is enlarged in comparison with the standard exposure so that the focusing range is enlarged. Needless to say, the time duration for which the program shutter is kept opened at a constant aperture in the aperture-priority exposure is so determined that the resultant exposure is similar to the standard exposure under the same conditions, but it should not be too long, so as not to be affected by camera-shake.

Although the present invention has been described in connection with various preferred embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

What is claimed is:

1. A camera having lens positioning means for adjusting a lens position of a taking lens, and a flash unit for emitting flash light, comprising:

a distance measuring device for generating distance measurement data representative of a subject distance;

light measuring means for generating data representative of a subject brightness;

a data table memory having data areas being addressed by a combination of said distance measurement data and said subject brightness data, each said data area storing lens position data for positioning said taking lens and flash flag data of a first or second condition, said flash flag data instructing in the first condition to execute flash photography and in the second condition not to execute flash photography; and control means for controlling said lens positioning means and said flash unit in accordance with said data read out from said data table memory.

2. A camera as defined in claim 1, wherein said data areas having flash flag data of the first condition further store flash timing data for determining a timing within which said flash unit is caused to flash.

3. A camera having lens positioning means for adjusting a lens position of a taking lens, a flash unit for emitting flash light, and a program shutter for controlling aperture size and shutter speed, comprising:

a distance measuring device for generating distance measurement data representative of a subject distance;

light measuring means for generating data representative of a subject brightness;

a data table memory having data areas being addressed by a combination of said distance measurement data and said subject brightness data, each of said data areas storing lens position data for positioning said taking lens, aperture data for controlling the aperture size of said program shutter, and flash flag data of a first or second condition, said flash flag data instructing in the first condition to execute flash photography and in the second condition not to execute flash photography; and control means for controlling said lens positioning means, said flash unit and said program shutter in accordance with said data read out from said data table memory.

4. A camera as defined in claim 3, wherein said data areas having flash flag of the first condition further store flash timing data for determining a timing within which said flash unit is caused to flash.

5. A camera as defined in claim 4, wherein said table data memory stores first and second aperture data, said first aperture data being used for photographing without flash light and said second aperture data being used for flash photography.

6. A camera as defined in claim 3, further comprising a flash mode designating means having a flash photography mode for making flash photography available and a flash preventing mode for making flash photography unavailable irrespective of said flash flag data.

7. A camera as defined in claim 6, wherein said data table memory stores first and second flash timing data, said first flash timing data determining a timing within which said flash unit is caused to flash when said flash mode designating means is set in said flash photography mode, and second flash timing data being stored along with said flash flag data of the first condition and determining a timing within which said flash unit is caused to flash in response to said flash flag data of the first condition.

8. A camera as defined in claim 3, wherein said data areas further store aperture-priority flag data of a first or second condition, said aperture-priority flag data instructing in the first condition to execute aperture-priority photography, and in the second condition not to execute aperture-priority photography.

9. A camera as defined in claim 8, further comprising a flash mode designating means having a flash photography mode for making flash photography available and a flash preventing mode for making flash photography unavailable irrespective of said flash flag data, said aperture-priority flag being effective so long as said flash mode designating means is set in said flash preventing mode.

10. A camera as defined in claim 9, wherein said data table memory stores first and second aperture data, said first aperture data being used for aperture-priority photography, and said second aperture data being used for other than aperture-priority photography.

* * * * *